United States Patent
Li

(10) Patent No.: US 11,677,153 B2
(45) Date of Patent: Jun. 13, 2023

(54) ANTENNA ASSEMBLY AND TERMINAL DEVICE

(71) Applicant: BEIJING XIAOMI MOBILE SOFTWARE CO., LTD., Beijing (CN)

(72) Inventor: Yueliang Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 39 days.

(21) Appl. No.: 17/240,973

(22) Filed: Apr. 26, 2021

(65) Prior Publication Data

US 2022/0037791 A1    Feb. 3, 2022

(30) Foreign Application Priority Data

Jul. 30, 2020    (CN) .......................... 202010754221.3

(51) Int. Cl.
| | | |
|---|---|---|
| *H01Q 1/24* | (2006.01) | |
| *H01Q 1/38* | (2006.01) | |
| *H01Q 9/04* | (2006.01) | |
| *H04B 1/034* | (2006.01) | |

(52) U.S. Cl.
CPC .......... *H01Q 9/0414* (2013.01); *H01Q 1/243* (2013.01); *H01Q 1/38* (2013.01); *H04B 1/034* (2013.01)

(58) Field of Classification Search
CPC ............ H01Q 1/24; H01Q 1/243; H01Q 1/44; H01Q 1/38; H01Q 13/206; H01Q 9/04; H01Q 9/0414
See application file for complete search history.

(56) References Cited

U.S. PATENT DOCUMENTS

| | | | |
|---|---|---|---|
| 10,256,527 B2 | 4/2019 | Kim et al. | |
| 2015/0155614 A1 | 6/2015 | Youn et al. | |
| 2016/0064820 A1* | 3/2016 | Kim ...................... | H01Q 9/045 |
| | | | 343/767 |
| 2016/0254590 A1* | 9/2016 | Seo ......................... | H04B 1/006 |
| | | | 343/876 |
| 2017/0201010 A1 | 7/2017 | Kim et al. | |
| 2017/0230073 A1 | 8/2017 | Youn et al. | |
| 2018/0041239 A1* | 2/2018 | Youn ..................... | G06F 1/1698 |
| 2018/0241430 A1 | 8/2018 | Youn et al. | |
| 2019/0007085 A1 | 1/2019 | Youn et al. | |

(Continued)

FOREIGN PATENT DOCUMENTS

| | | |
|---|---|---|
| KR | 20120046962 A | 5/2012 |
| KR | 20170018682 A | 2/2017 |
| KR | 20180029326 A | 3/2018 |

OTHER PUBLICATIONS

Office Action of the Indian Application No. 202144019147, dated Feb. 14, 2022, (5p).

(Continued)

*Primary Examiner* — Thai Pham
(74) *Attorney, Agent, or Firm* — Arch & Lake LLP

(57) ABSTRACT

An antenna assembly and a terminal device are provided. The antenna assembly includes a conductive frame, a circuit board, and a metal conductor. The metal conductor has one end connected to a feed point on the circuit board and the other end connected to a switch on the circuit board and the conductive frame. The switch is configured to adjust a radiation frequency band of the antenna assembly. A radiator of the antenna assembly comprises the metal conductor and the conductive frame.

13 Claims, 14 Drawing Sheets

(56) References Cited

U.S. PATENT DOCUMENTS

2019/0214707 A1* 7/2019 Kim ...................... H01Q 1/243
2019/0393919 A1   12/2019 Youn et al.

OTHER PUBLICATIONS

Extended European Search Report in European Application No. 21171303.7, dated Oct. 18, 2021, (11p).
First Office Action of the Korean Application No. 10-2021-0055048, dated May 24, 2022 with English translation, (9p).

* cited by examiner

ANTENNA ASSEMBLY AND TERMINAL DEVICE

CROSS-REFERENCE TO RELATED APPLICATION

This application is based on and claims priority to Chinese Patent Application No. 202010754221.3, filed on Jul. 30, 2020, the disclosure of which is hereby incorporated by reference in its entirety for all purposes.

TECHNICAL FIELD

The present disclosure relates to the technical field of communications, and in particular to an antenna assembly and a terminal device.

BACKGROUND

With the rapid development of communication technology and demand of science and technology, a terminal device is gradually developed towards miniaturization, broadbandization and integration of the 4th generation mobile communication technology (4G) and the 5th generation mobile communication technology (5G). When an antenna assembly is arranged in the terminal device, a position of the antenna assembly at a bottom of the terminal device is limited because an audio component of the terminal device is disposed at the bottom of the terminal device, thereby affecting a transmission and reception efficiency of the antenna assembly.

SUMMARY

The present disclosure provides an antenna assembly and a terminal device.

According to a first aspect of the disclosure, an antenna assembly is provided. The antenna assembly includes a conductive frame, a circuit board, and a metal conductor, wherein the metal conductor has one end configured to connect to a feeding point on the circuit board and the other end configured to connect to a switch on the circuit board and the conductive frame, and the switch is configured to adjust a radiation frequency band of the antenna assembly; and a radiator of the antenna assembly comprises the metal conductor and the conductive frame.

According to a second aspect of the disclosure, a terminal device is provided. The terminal device includes an antenna assembly that comprises a conductive frame, a circuit board, and a metal conductor; wherein the metal conductor has one end configured to connect to a feeding point on the circuit board and the other end configured to connect to a switch on the circuit board and the conductive frame, and the switch is configured to adjust a radiation frequency band of the antenna assembly; and a radiator of the antenna assembly comprises the metal conductor and the conductive frame.

It should be understood that the foregoing general description and the following detailed description are exemplary and explanatory only and are not intended to limit the disclosure.

BRIEF DESCRIPTION OF THE DRAWINGS

The accompanying drawings, which are incorporated into and constitute a part of the description, illustrate examples consistent with the disclosure and, together with the description, serve to explain principles of the disclosure.

DETAILED DESCRIPTION

Figure 1:
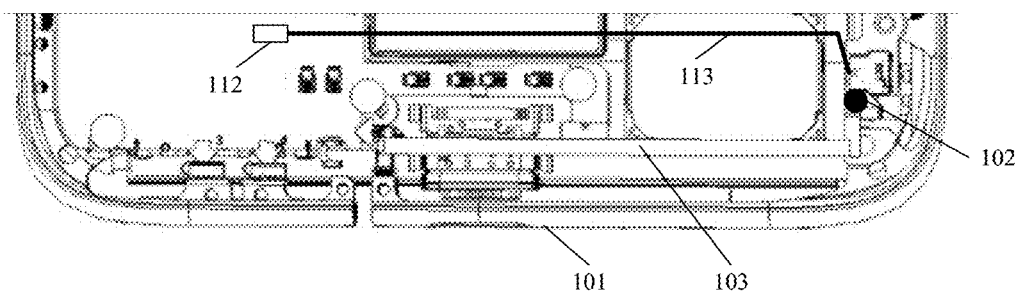
FIG. 1 is a first schematic diagram illustrating an antenna assembly according to an example of the present disclosure.

Reference will now be made in detail to exemplary embodiments, examples of which are illustrated in the accompanying drawings. The following description refers to the accompanying drawings in which the same numbers in different drawings represent the same or similar elements, unless specifically stated otherwise. The implementations set forth in the following description of examples do not represent all implementations consistent with the disclosure. Instead, they are merely examples of apparatuses and methods consistent with some aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a first structural schematic diagram of an antenna assembly according to an example of the present disclosure. As illustrated in FIG. 1, the antenna assembly includes a conductive frame 101, a circuit board, and a metal conductor 103.

The metal conductor 103 has one end configured to connect to a feeding point 102 on the circuit board, and the other end configured to connect to a switch assembly on the circuit board and the conductive frame 101. The switch assembly is configured to adjust a radiation frequency band of the antenna assembly.

A radiator of the antenna assembly includes the metal conductor 103 and the conductive frame 101.

The antenna assembly may be applied to a terminal device. The terminal device may be a wearable electronic device and a mobile terminal. The mobile terminal includes a mobile phone, a notebook or a tablet computer, and the wearable electronic device includes a smart watch or smart glasses, which are not limited in the examples of the disclosure.

The conductive frame is a frame which is surrounding the terminal device and exposed to the outside. The conductive frame may be a frame made of metal or alloy, which is not limited in the examples of the disclosure.

In an example of the disclosure, the terminal device may further include a middle frame disposed in a space surrounded by the conductive frame, and the middle frame may be configured to support the circuit board.

The circuit board may include a printed circuit board which may be arranged with various function modules in the terminal device. For example, the circuit board may be arranged with an audio component for outputting an audio signal, or a processing component for information processing, which is not limited in the example of the disclosure.

In an example of the disclosure, the antenna assembly further includes a radiator and a feeding point. The radiator may be configured to transmit and receive radio signals in different frequency bands. For example, the radiator may transmit and receive a radio signal in a frequency band corresponding to 2nd-Generation (2G), 3rd-Generation (3G), or 4G, and may also transmit and receive a radio signal in a frequency band corresponding to 5G, which is not limited in the example of the disclosure.

The feeding point is connected to the radiator and is configured to transmit a signal. The antenna assembly may further include a radio frequency front end assembly and a feeder line connected between the radio frequency front end assembly and the feeding point. When radiating the radio signal, the feeder line outputs a first electric signal generated by the radio frequency front end assembly to the feeding point, and outputs the first electric signal to the radiator through the feeding point. When receiving the radio signal, the radiator converts the received radio signal into a second electric signal, and transmits the second electric signal to the feeder line through the feeding point, then the second electric signal may be transmitted to the radio frequency front end assembly through the feeder line.

Herein, the radio frequency front end assembly includes a first amplifier, a filter, a duplexer, and a second amplifier. The first amplifier is configured to amplify an electric signal in a signal output channel. The filter is configured to pass a signal in a specific frequency band and filter out a signal outside the specific frequency band. The duplexer is configured to separate a transmitted electric signal from a received electric signal, so that the antenna may operate normally when receiving and transmitting the radio signal at the same time. The second amplifier is configured to amplify an electric signal in a signal receiving channel. In this way, the reception and transmission of the electric signal are implemented by the radio frequency front end assembly, so that the radiator of the antenna assembly may transmit and receive the radio signal better.

The radiator further includes a metal conductor configured to connect the feeding point and the conductive frame. In some examples, the metal conductor includes metal strips respectively connected to the feeding point and the conductive frame. In an example of the disclosure, the metal conductor may be not only in the form of a metal strip, but also in the form of bending. For example, the metal conductor may also be L-shaped, which is not limited in the example of the disclosure.

In an example of the disclosure, a length of the metal conductor may be set corresponding to a size of the conductive frame. For example, the larger a distance between two oppositely disposed frames in the conductive frame, the longer the corresponding length of the metal conductor may be set.

Illustratively, the length of the metal conductor may be set to 45 mm or 50 mm, which is not limited in the example of the disclosure.

In an example of the disclosure, the length of the metal conductor is inversely correlated with a frequency radiated by the antenna assembly. For example, the longer the length of the metal conductor, the smaller the lowest frequency in a range of the frequencies radiated by the antenna assembly.

The feeding point is connected to the metal conductor, and the metal conductor is connected to the conductive frame. That is, the feeding point in the example of the disclosure is not directly connected to the conductive frame, but indirectly connected to the conductive frame through the metal conductor. Therefore, according to the example of the disclosure, under the condition that a position where the antenna assembly is connected to the conductive frame is unchanged, a position of the feeding point may be flexibly set by means of the metal conductor.

The switch assembly has different switching states, and the antenna assembly may radiate different frequency bands based on the different switching states. Therefore, the radiation frequency band of the antenna assembly may be adjusted by the switch assembly to adapt to different scenarios in which the antenna assembly is involved, and the radiation efficiency of the antenna assembly may be improved. For example, a model of the switch assembly includes, but is not limited to, QM13146.

Figure 2:
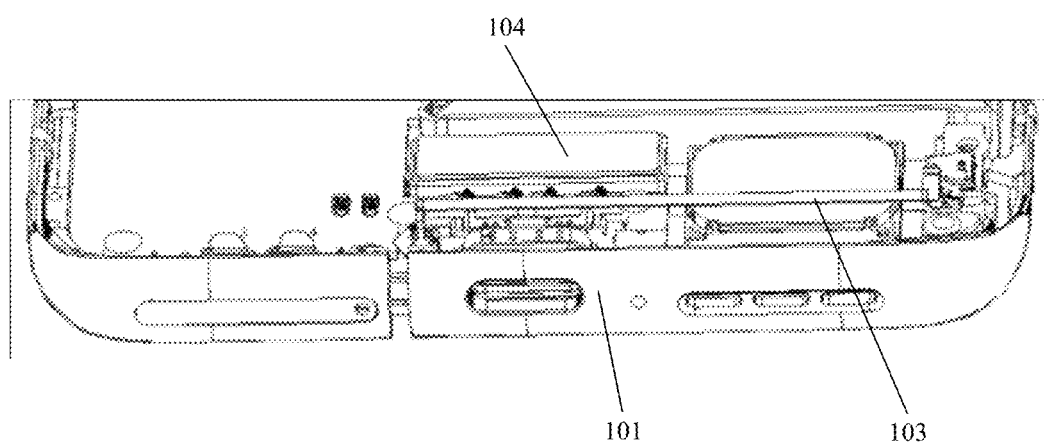
FIG. 2 is a second schematic diagram illustrating an antenna assembly according to an example of the present disclosure.

Illustratively, as illustrated in FIG. 2, an audio component 104 is disposed at the bottom of the terminal device. When the position of the feeding point is set, the position of the feeding point and a position connecting the conductive frame may be respectively set on both sides of the audio component 104, and the metal conductor 103 may be stacked on the audio component 104. In this way, the case where the position of the feeding point is limited by the audio component may be alleviated by connecting the conductive frame and the feeding point through the metal conductor, so that a layout of the feeding point may be more flexible.

In the example of the disclosure, the metal conductor is connected between the feeding point and the conductive frame, namely, the feeding point is connected to the conductive frame through the metal conductor. Under the condition that the connection position of the conductive frame is unchanged, the position of the feeding point may be flexibly set by means of the metal conductor. Therefore, the case where the position of the feeding point is limited may be alleviated. Moreover, compared with the feeding point directly connected to the conductive frame, in the examples of the disclosure, the feeding point is connected to the conductive frame through the metal conductor, so that a radiation area of the radiator may be increased when the radio signal is transmitted and received, and the radiation efficiency of the antenna may be further improved. In addition, since the feeding point is connected to the conductive frame through the metal conductor, a circuit flow path may be effectively increased, and a lowest frequency at which the terminal device transmits and receives the radio signal may be reduced, so that a range of a frequency band in which the terminal device transmits and receives the radio signal may be enlarged.

Figure 3:
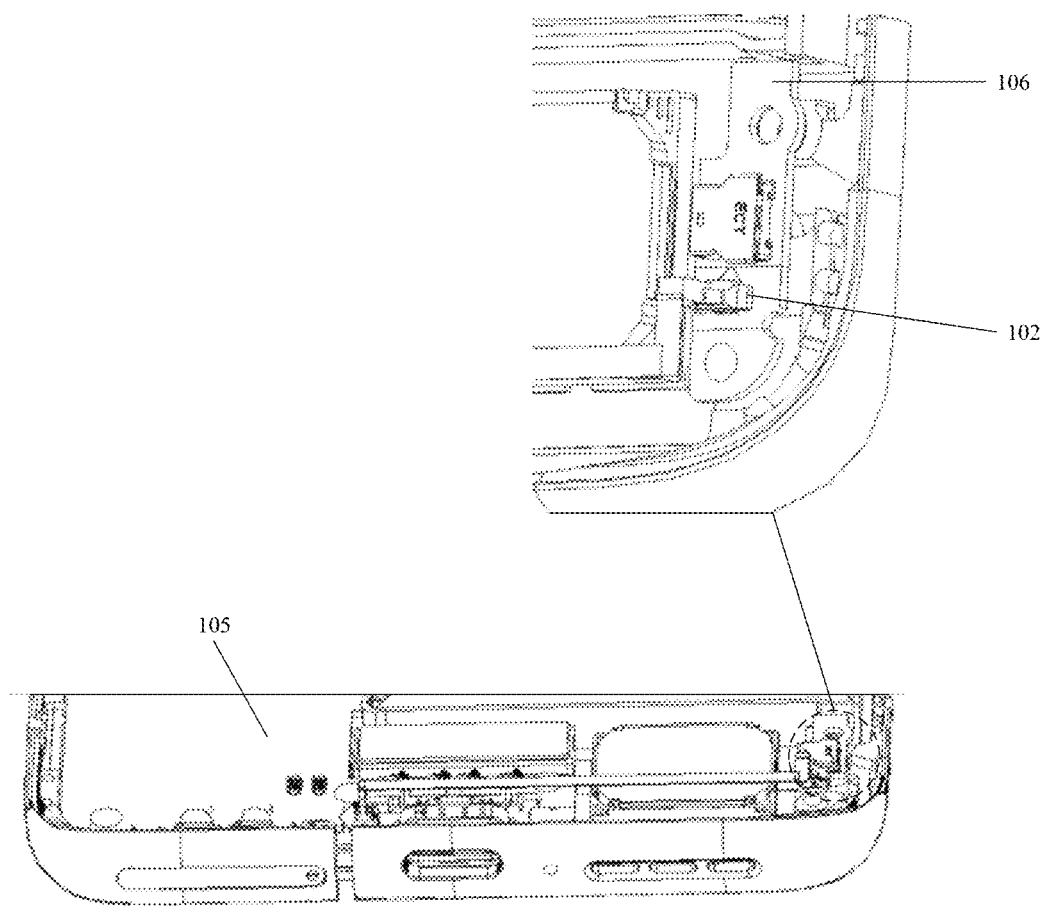
FIG. 3 is a third schematic diagram illustrating an antenna assembly according to an example of the present disclosure.

In some examples, as illustrated in FIG. 3, the circuit board includes a first circuit board 105 and a second circuit board 106 disposed separately from the first circuit board 105.

The feeding point 102 is disposed on the second circuit board 106.

The switch assembly is disposed on the first circuit board 105.

In other examples, the antenna assembly further includes a radio frequency front end assembly 112 disposed on the first circuit board. The first circuit board is connected to the second circuit board through a transmission circuit 113, and the transmission circuit 113 is at least configured to transmit a first electrical signal to the radio frequency front end assembly 112 and/or transmit a second electric signal generated by the radio frequency front end assembly 112 to the feeding point.

In the example of the disclosure, the circuit board includes the first circuit board and the second circuit board. The first circuit board may be provided with other modules besides the switch assembly. For example, the other modules may be a processing module, an audio component, or the radio frequency front end assembly, which are not limited in the example of the disclosure.

It should be noted that the first circuit board and the second circuit board are both printed circuit boards. In some examples, an area of the second circuit board is smaller than an area of the first circuit board. In other examples, a volume of the second circuit board is smaller than a volume of the first circuit board.

In an example of the disclosure, the conductive frame may be a rectangular frame. The first circuit board and the second circuit board are separately disposed, including: the first circuit board and the second circuit board are separately disposed between two long frames that are oppositely disposed; or, the first circuit board and the second circuit board are separately disposed between two short frames that are oppositely disposed. A length of the long frame is larger than a length of the short frame.

The second circuit board may be connected with the first circuit board through a Board to Board (BTB) connector; or, the second circuit board may be connected with the first circuit board through a coaxial line. The transmission circuit may be disposed on the BTB connector or the coaxial line, which is not limited in the example of the disclosure.

The feeding point is disposed on the second circuit board. The second circuit board may further be provided with a matching circuit of the antenna assembly besides the feeding point. The matching circuit is connected to the feeding point and is configured for impedance matching, such that an energy generated by the antenna assembly may be maximally radiated through the radiator.

In the example of the disclosure, the first circuit board is disposed separately from the second circuit board, and the feeding point is disposed on the second circuit board. In this way, the antenna assembly in the example of the disclosure may be applied to a terminal device having two circuit boards. Moreover, the feeding point is disposed on the second circuit board, so that a flexible layout of the antenna assembly may be realized.

Figure 4:
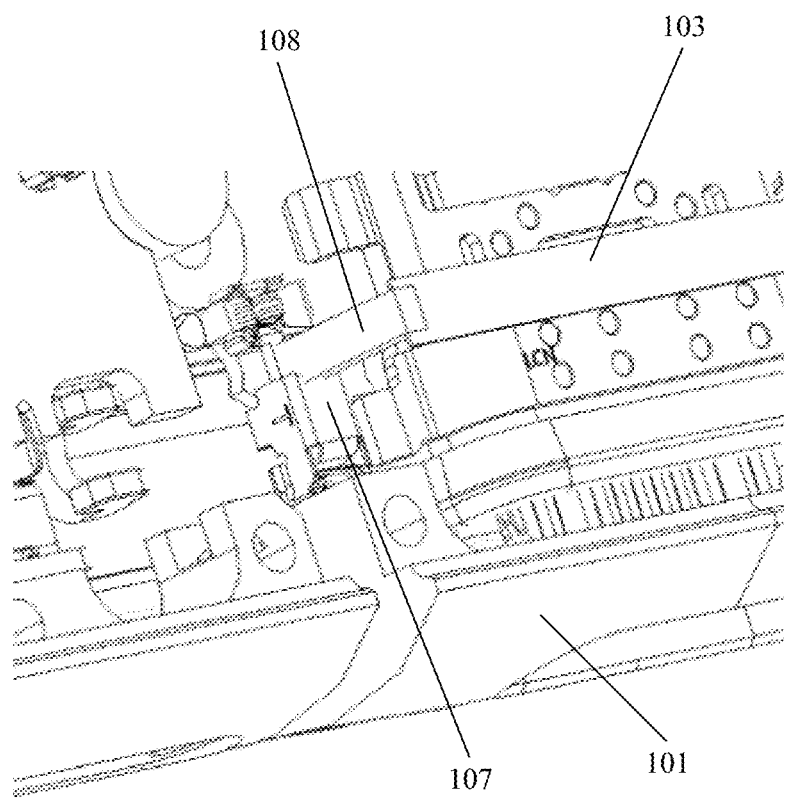
FIG. 4 is a fourth schematic diagram illustrating an antenna assembly according to an example of the present disclosure.
Figure 5:
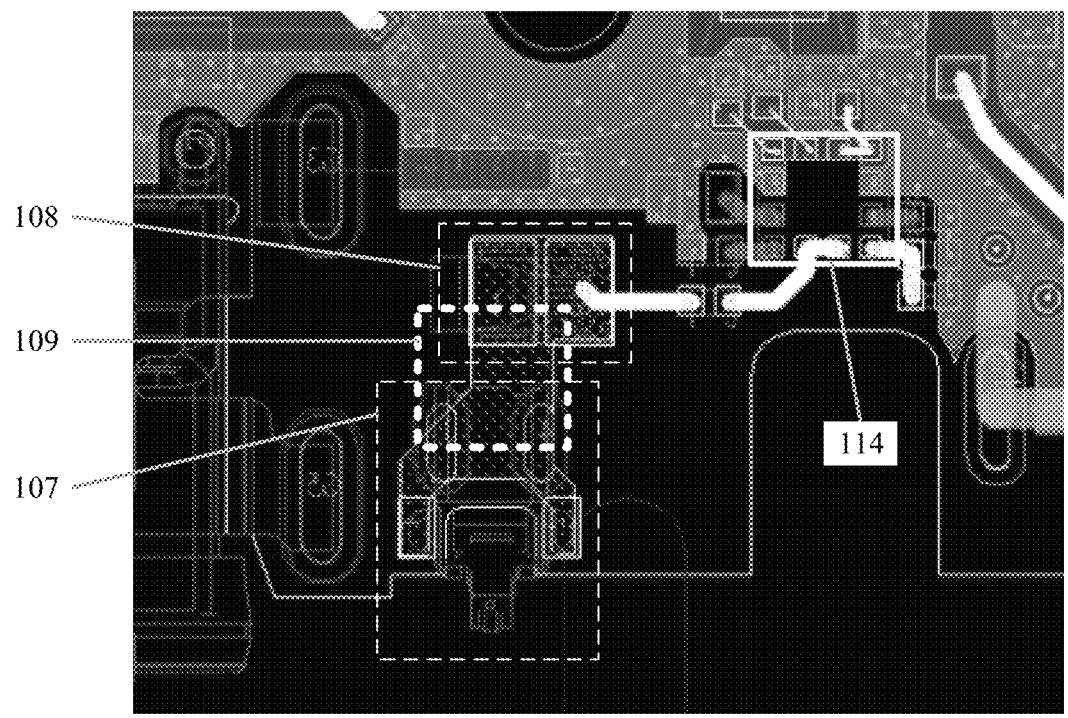
FIG. 5 is a fifth schematic diagram illustrating an antenna assembly according to an example of the present disclosure.

In some examples, as illustrated in FIG. 4 and FIG. 5, the antenna assembly further includes a connection assembly configured to connect the conductive frame, the switch assembly 114, and the metal conductor. The connection assembly includes a first elastic piece 107 and a second elastic piece 108.

The first elastic piece 107 is configured to connect the switch assembly and the conductive frame 101.

The second elastic piece 108 is configured to connect the switch assembly and the metal conductor 103.

In the example of the disclosure, the second elastic piece is connected to the metal conductor, and the second elastic piece is connected to the first elastic piece through the switch assembly, and the first elastic piece is connected to the conductive frame, such that the connection between the metal conductor and the conductive frame is realized.

In an example of the disclosure, the first elastic piece and the second elastic piece may both be metal pieces, and have certain elasticity and extensibility.

The first elastic piece includes a first fixed end and a first free end. The first fixed end is fixed on the first circuit board and connected to the switch assembly. The first free end is in contact with the conductive frame and pressed by the conductive frame, so that a stable connection with the conductive frame may be established by restoring from its own elastic deformation.

Similarly, the second elastic piece includes a second fixed end and a second free end. The second fixed end is fixed on the first circuit board and connected to the switch assembly. The second free end is in contact with the metal conductor and pressed by the metal conductor, so that a stable connection with the metal conductor may be established by restoring from its own elastic deformation.

The first fixed end of the first elastic piece and the second fixed end of the second elastic piece are fixed at different positions on the first circuit board.

It should be noted that the first elastic piece may be stably disposed in the terminal device by fixing the first fixed end on the first circuit board, and the first elastic piece may also be stably connected to the conductive frame. Similarly, the second elastic piece may be stably disposed in the terminal device by fixing the second fixed end on the first circuit board, and the metal conductor connected to the second elastic piece may also be stably disposed in the terminal device.

In an example of the disclosure, in order to further enable the first elastic piece to be stably connected to the conductive frame, the conductive frame may be provided with a groove in which at least a portion of the first free end of the first elastic piece may be embedded. In this way, when the terminal device is dropped or in different postures, a movement of the first free end may be blocked by a wall of the groove, so that the connection between the first elastic piece and the conductive frame may be more stable through the groove.

It should be noted that a shape and size of the groove may be determined according to the portion of the first free end that is embedded in the groove. For example, the shape of the groove may be similar or identical to a shape of the embedded portion of the first free end, and the size of the groove may be greater than or equal to a size of the embedded portion of the first free end, which are not limited in the example of the disclosure.

In some examples, diameters of the first elastic piece and the second elastic piece are greater than 2 mm. In this way, the first elastic piece and the second elastic piece are set to be larger than 2 mm, so that a better connection of the switch assembly, the conductive frame and the metal conductor may be realized.

In an example of the disclosure, as illustrated in FIG. 5, the first elastic piece 107 is connected to the second elastic piece 108 through a connection line 109. A line width of the connection line is larger than a preset width, and the preset width may be larger than or equal to 2 mm, which is not limited in the example of the disclosure. According to the example of the disclosure, the line width of the connection line is larger than the preset width, thus the electric signal may be transmitted better, and the connection between the first elastic (conductive) piece and the second elastic (conductive) piece may be more stable. Illustratively, the connection line includes, but is not limited to, a copper wire.

Figure 6:
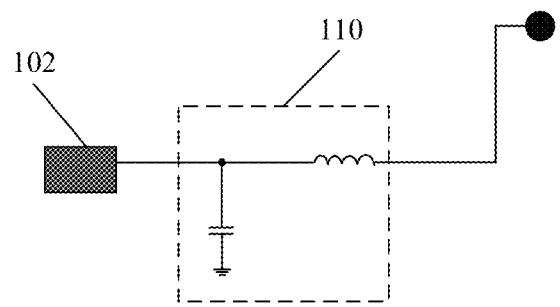
FIG. 6 is a schematic diagram illustrating a matching circuit according to an example of the present disclosure.

In some examples, as illustrated in FIG. 6, the antenna assembly further includes a matching circuit 110.

The matching circuit 110 is disposed on the second circuit board and between the feeding point 102 and the transmission circuit. The matching circuit includes at least one inductor and at least one capacitor.

The inductor is configured to connect the feeding point and the transmission circuit.

The capacitor is configured to connect the inductor and the feeding point.

In an example of the disclosure, the matching circuit may be set according to a Smith chart. For example, when an output impedance of the radio frequency front end assembly connected to the feeding point is 50 ohms, an impedance of the matching circuit is matched to an impedance in the vicinity of the 50 ohms in the Smith chart. Further, the obtained impedance of the matching circuit may be matched to the impedance of the radio frequency front end assembly, so that the energy generated by the radio frequency front end assembly may be maximally radiated through the radiator.

Figure 7:
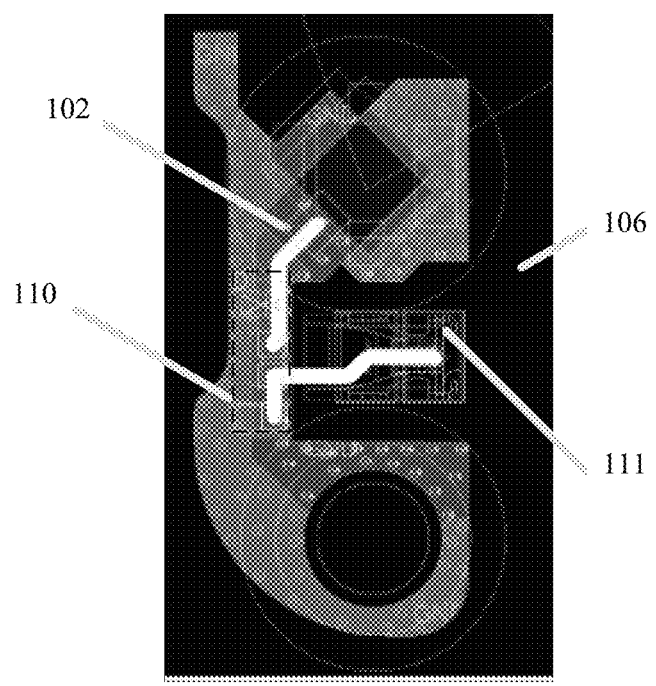
FIG. 7 is a sixth schematic diagram illustrating an antenna assembly according to an example of the present disclosure.

It should be noted that the feeding point is disposed on the second circuit board, and the metal conductor is connected to the feeding point. When the matching circuit is provided, the matching circuit may be disposed on the second circuit board. Illustratively, as illustrated in FIG. 7, the feeding point 102, the matching circuit 110, and the conductive piece 111 are all disposed on the second circuit board 106. One connection terminal of the matching circuit 110 is configured to connect to the feeding point 102.

In the example of the disclosure, the feeding point may be connected to the metal conductor by soldering, a metal colloid, or a conductive piece, which is not limited in the example of the disclosure. The conductive piece includes, but is not limited to, a conductive elastic piece.

Figure 8:
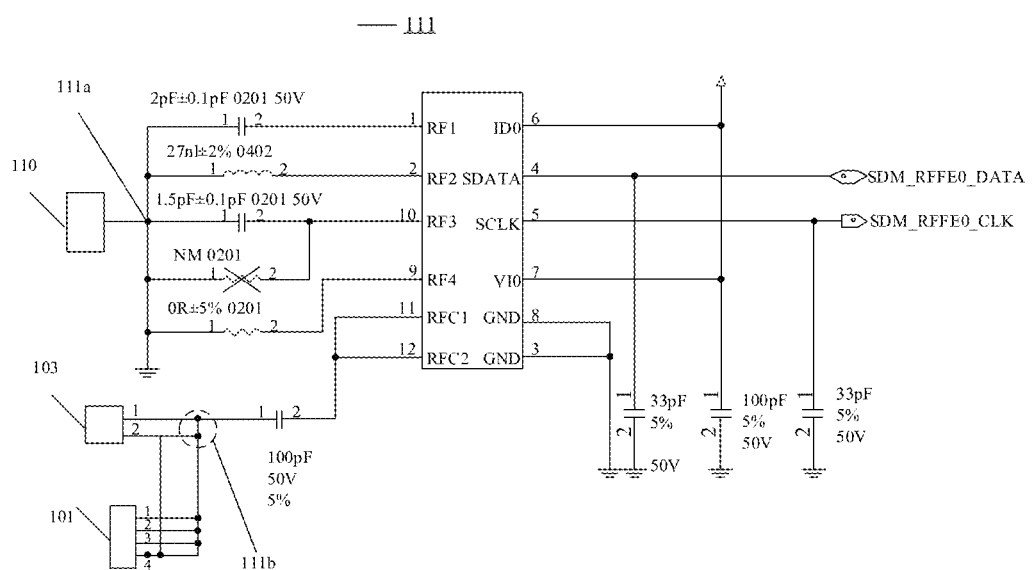
FIG. 8 is a schematic diagram illustrating a switch assembly according to an example of the present disclosure.

In some examples, as illustrated in FIG. 8, the switch assembly 111 includes a first type of connection terminal 111a and a second type of connection terminal 111b.

The first type of connection terminal 111a is configured to connect to the matching circuit 110.

The second type of connection terminal 111b is configured to connect the metal conductor 101 and the conductive frame 103.

In an example of the present disclosure, the matching circuit includes at least two matching sub-circuits. The switching assembly further includes a switching circuit connected to the matching circuit through the first type of connection terminal.

It should be noted that the switch circuit is adapted to connect to at least one of the at least two matching sub-circuits through switching. That is, when the switch assembly is connected to different matching sub-circuits in the at least two matching sub-circuits through switching, the antenna assembly has different impedance matching values. Therefore, when the antenna assembly receives and transmits radio signals in different frequency bands, the antenna assembly may be provided with impedance matching values corresponding to the different frequency bands, so that the energy of the antenna assembly may be maximally radiated through the radiator.

In an example of the disclosure, the switch circuit may include at least one switch path. The switch path is configured to connect to a matching sub-circuit, and then different matching sub-circuits may be connected to the radiator by switching, such that the antenna assembly may have different matching values.

Illustratively, the switch assembly includes, but is not limited to, a single-pole four-throw switch applied for tuning the antenna assembly. As illustrated in FIG. 8, the switch assembly may be of a QM13146 type, and switching of the switch is controlled by controlling a data line SDM_RFFE0_DATA and a clock line SDM_RFFE0_CLK through a mobile industry processor interface (MIPI). Therefore, the antenna assembly may have different matching values, and switching between different frequency bands may be realized.

Figure 9:
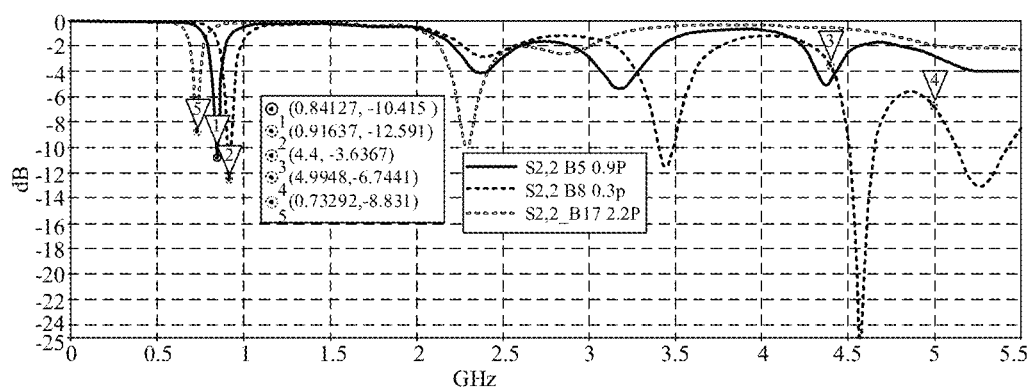
FIG. 9 is a schematic diagram illustrating a simulation of a return loss of an antenna assembly according to an example of the present disclosure.

FIG. 9 is a simulation graph illustrating return losses corresponding to the antenna assembly having different matching values. As illustrated in FIG. 9, when frequency points are 841M, 732M, and 916M, the return losses of the antenna assembly are in a range of −8 dB to −14 dB. When the frequency points are 4.4G and 4.99G, the return losses of the antenna assembly are in a range of −2 dB to −8 dB. As a result, use requirements on the return loss of the antenna assembly may be met.

Figure 10:
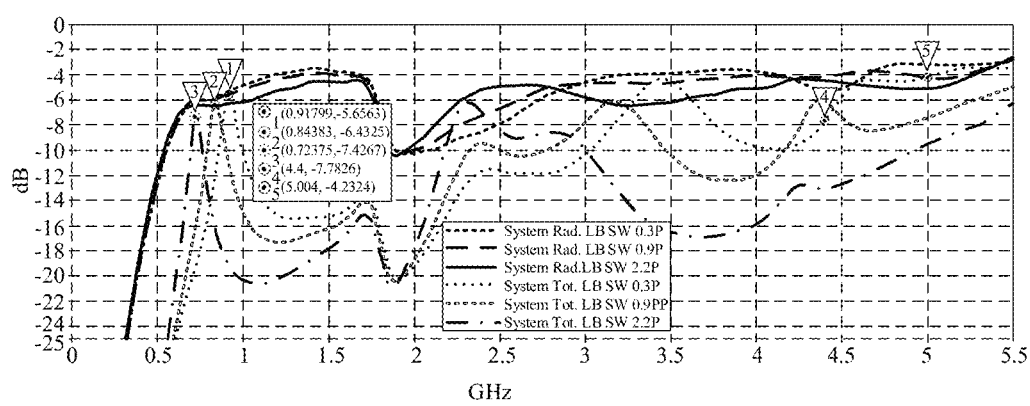
FIG. 10 is a schematic diagram illustrating a simulation of a radiation efficiency of an antenna assembly according to an example of the present disclosure.

FIG. 10 illustrates radiation efficiencies corresponding to the antenna assembly having different matching values. As illustrated in FIG. 10, when the frequency points are 843M, 723M, and 917M, the radiation efficiencies of the antenna assembly are in a range of −6 dB to −8 dB. When the frequency points are 4.4G and 5G, the radiation efficiencies of the antenna assembly are in a range of −4 dB to −8 dB. As a result, use requirements on the radiation efficiency of the antenna assembly may be met.

Figure 11:
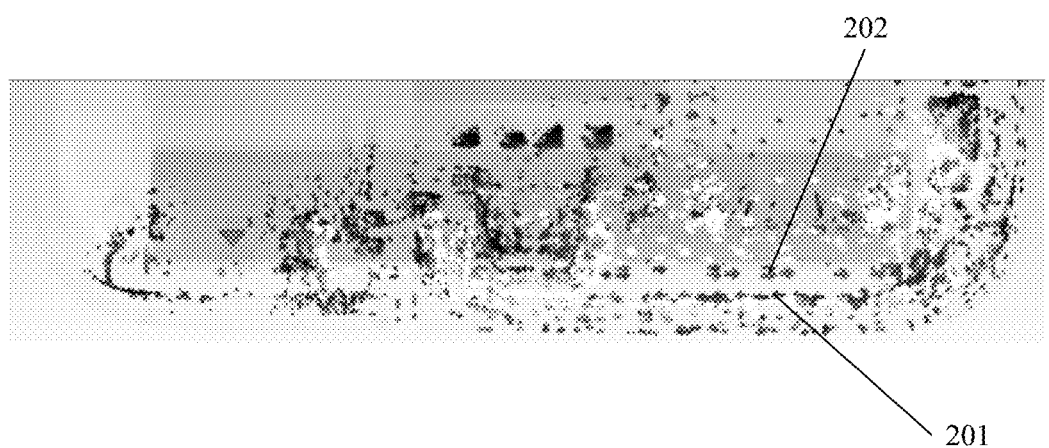
FIG. 11 is a first schematic diagram illustrating a current of an antenna assembly according to an example of the present disclosure.
Figure 12:
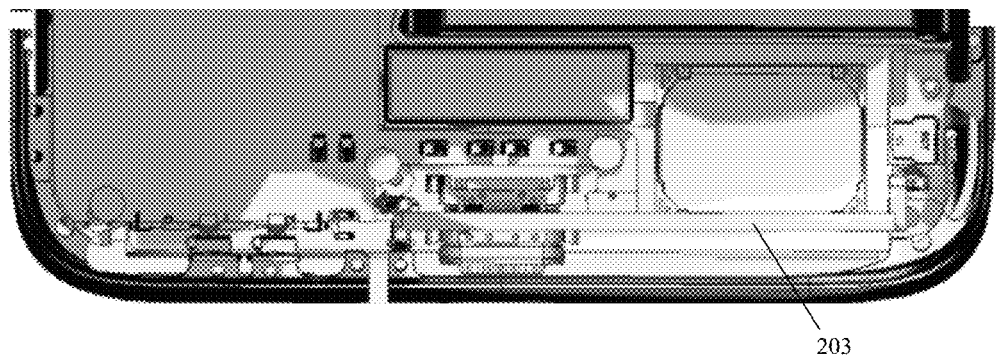
FIG. 12 is a second schematic diagram illustrating a current of an antenna assembly according to an example of the present disclosure.

FIG. 11 and FIG. 12 are current flow diagrams of the antenna assembly operating in a loop mode. As illustrated in FIG. 11 and FIG. 12, a direction of the current flow represented by 201 is opposite to a direction of the current flow represented by 202. 203 represents a current distribution region for the antenna assembly to transmit and receive the radio signal.

Figure 13:
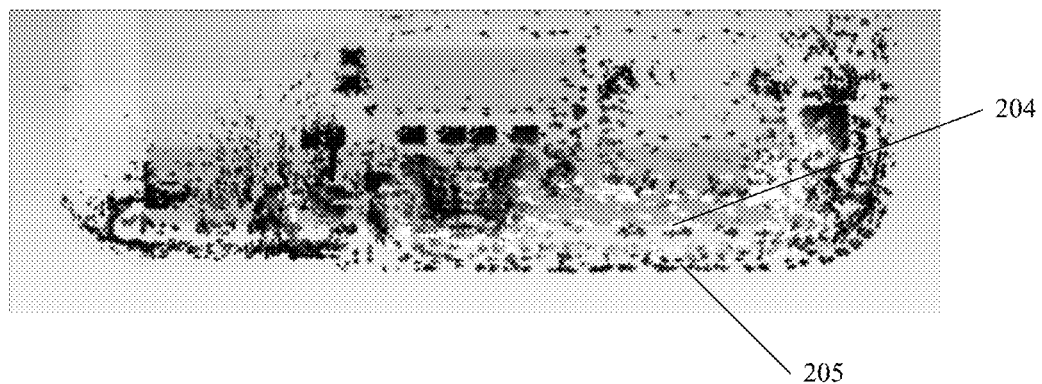
FIG. 13 is a third schematic diagram illustrating a current of an antenna assembly according to an example of the present disclosure.

FIG. 13 is a current flow diagram of the antenna assembly operating in a higher order mode. As illustrated in FIG. 13, a direction of the current flow represented by 204 is opposite to a direction of the current flow represented by 205.

In some examples, the metal conductor is a metal conductor formed by laser direct structuring; or, the metal conductor is a metal conductor formed by a conductive wire in a flexible printed circuit board.

In this way, the metal conductor may be formed flexibly by the laser direct structuring or the wire in the flexible printed circuit board.

In some examples, the circuit board includes a first circuit board and a second circuit board.

The conductive frame includes a long frame and a short frame adjacent to the long frame. The length of the long frame is larger than the length of the short frame.

The second circuit board is disposed between the first circuit board and the long frame.

The metal conductor is configured to connect to the short frame.

In an example of the disclosure, the first circuit board is provided with a processing module, and the area of the first circuit board is larger than the area of the second circuit board. The second circuit board may be flexibly disposed on an area between the first circuit board and the long frame.

It should be noted that when positioning the metal conductor, the metal conductor may be connected to the short frame near the second circuit board.

In some examples, there are two short frames including a first short frame and a second short frame disposed opposite to the first short frame. The first short frame is a short frame at the bottom of the terminal device, and the second short frame is a short frame at the top of the terminal device. A distance between the first circuit board and the first short frame is smaller than a distance between the first circuit board and the second short frame. The metal conductor is connected to the first short frame.

In this way, a distance between the metal conductor and the connected short frame may be reduced by connecting the metal conductor to the short frame near the second circuit board. A size of the connection assembly connecting the metal conductor and the short frame may be reduced, so that a space occupied by the antenna assembly in the terminal device may be reduced.

An example of the disclosure further provides a terminal device which includes the antenna assembly in the above one or more examples.

In some examples, the terminal device further includes an audio component and/or a USB component.

The antenna assembly includes a first circuit board and a second circuit board. The first circuit board and the second circuit board are respectively disposed on both sides of the audio component and/or the USB component.

In some examples, the USB component is configured not to be grounded, and the USB component is configured to be coupled with the metal conductor.

The metal conductor in the antenna assembly in the example of the disclosure may be coupled to the USB component, so that the USB component and the metal conductor may be jointly configured to receive and transmit the radio signal. In this way, the radiation area may be increased when the radio signal is transmitted and received, and the radiation efficiency of the antenna may be further improved.

It should be noted that "first" and "second" in the examples of the disclosure are merely convenient for expression and distinction, and have no other specific meanings.

Figure 14:
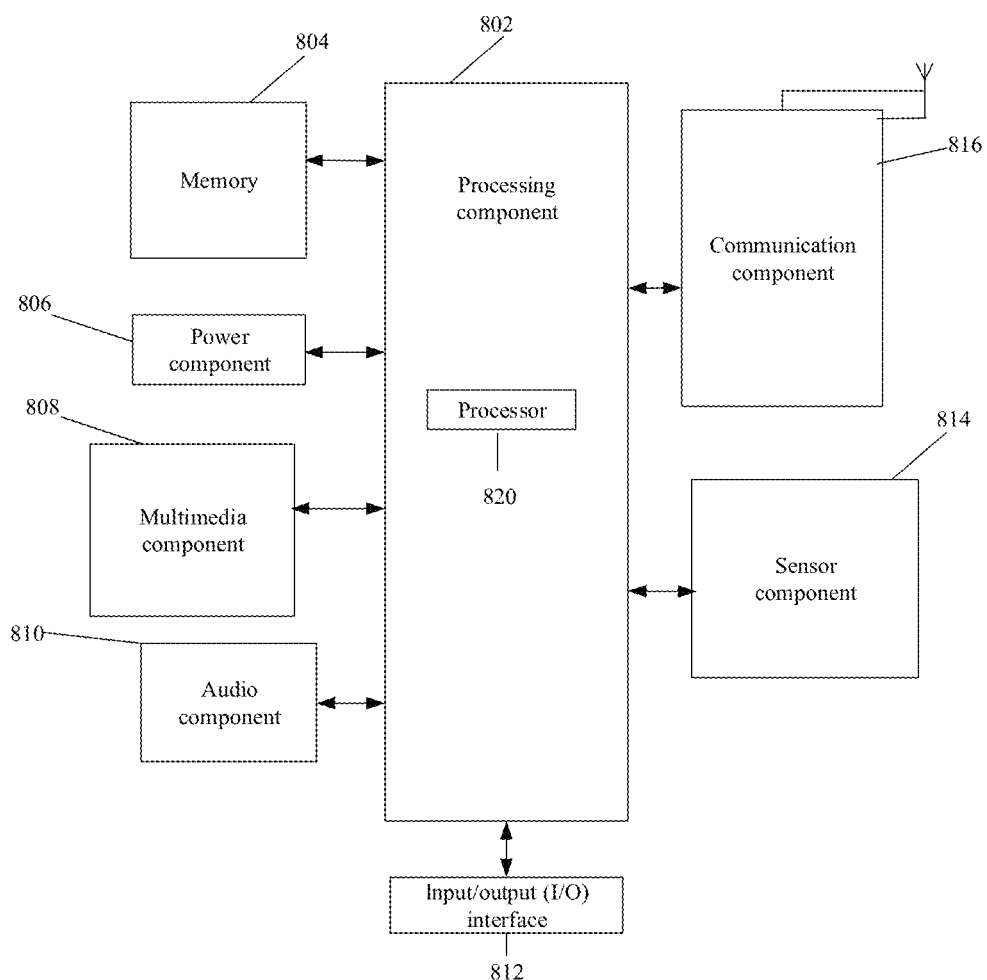
FIG. 14 is a block diagram illustrating a terminal device according to an example of the present disclosure.

FIG. 14 is a block diagram of a terminal device according to an example of the present disclosure. For example, the terminal device may be a mobile phone, a computer, a digital broadcast terminal, a messaging device, a game console, a tablet device, a medical device, an exercise device, a personal digital assistant, and the like.

Referring to FIG. 14, the terminal device may include one or more of the following components: a processing component 802, a memory 804, a power component 806, a multimedia component 808, an audio component 810, an input/output (I/O) interface 812, a sensor component 814, and a communication component 816.

The processing component 802 is typically configured to control overall operations of the terminal device, such as the operations associated with displays, telephone calls, data communications, camera operations, and recording operations. The processing component 802 may include one or more processors 820 to execute instructions to perform all or a part of the operations in the abovementioned methods. Moreover, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support operations of the terminal device. Examples of such data include instructions for any application programs or methods operated on the terminal device, contact data, phonebook data, messages, pictures, video, etc. The memory 804 may be implemented by any type of volatile or non-volatile memory devices or a combination thereof, such as static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 is configured to provide power for various components of the terminal device. The power component 806 may include a power management system, one or more power supplies, and other components associated with generating, management, and distributing power for the terminal device.

The multimedia component 808 includes a screen providing an output interface between the terminal device and a user. In some examples, the screen may include a liquid crystal display (LCD) and a touch panel (TP). If the screen includes a touch panel, the screen may be implemented as a touch screen to receive an input signal from the user. The touch panel includes one or more touch sensors to sense touches, swipes, and gestures on the touch panel. The touch sensors may not only sense the boundary of a touch or swipe action, but also detect a duration and pressure associated with the touch or swipe action. In some examples, the multimedia component 808 includes a front camera and/or a rear camera. The front camera and/or the rear camera may receive external multimedia data when the terminal device is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC) configured to receive an external audio signal when the terminal device is in an operating mode, such as a call mode, a recording mode, and a voice recognition mode. The received audio signal may further be stored in the memory 804 or transmitted through the communication component 816. In some examples, the audio component 810 further includes a speaker configured to output an audio signal.

The I/O interface 812 is configured to provide an interface between the processing component 802 and a peripheral interface module, and the peripheral interface module may be a keyboard, a click wheel, a button, and the like. The button may include, but is not limited to: a home page button, a volume button, a starting button, and a locking button.

The sensor component 814 includes one or more sensors configured to provide status assessment in various aspects for the terminal device. For example, the sensor component 814 may detect an on/off status of the terminal device and relative positioning of the components, such as a display and keypad of the terminal device, the sensor component 814 may also detect a change in the position of the terminal device or a component of the terminal device, the presence or absence of contact between the user and the terminal device, orientation or acceleration/deceleration of the terminal device, and a change in temperature of the terminal device. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in imaging applications. In some examples, the sensor component 814 may also include an acceleration sensor, a gyroscope sensor, a magnetic sensor, a pressure sensor, or a temperature sensor.

The communication component 816 is configured to facilitate wired or wireless communication between the terminal device and other devices. The terminal device may access a communication-standard-based wireless network, such as wireless fidelity (WiFi), 2G or 3G or a combination thereof. In an example, the communication component 816 is configured to receive a broadcast signal or broadcast associated information from an external broadcast management system through a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a bluetooth (BT) technology, and other technologies.

In an example, the terminal device may be implemented with one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the above described methods.

In some implementations, the circuit board includes a first circuit board and a second circuit board disposed separately from the first circuit board.

The feeding point is disposed on the second circuit board.

The switch assembly is disposed on the first circuit board.

In some implementations, the antenna assembly includes a radio frequency front end assembly disposed on the first circuit board.

The first circuit board is configured to connect with the second circuit board through a transmission circuit, and the transmission circuit is configured to perform at least one of the following operations: transmitting a first electric signal to the radio frequency front end assembly; or transmitting a second electric signal generated by the radio frequency front end assembly to the feeding point.

In some implementations, an area of the second circuit board is smaller than an area of the first circuit board.

In some implementations, the antenna assembly further includes a connection assembly configured to connect the conductive frame, the switch assembly, and the metal conductor.

The connection assembly includes a first elastic piece and a second elastic piece.

The first elastic piece is configured to connect the switch assembly and the conductive frame.

The second elastic piece is configured to connect the switch assembly and the metal conductor.

In some implementations, diameters of the first elastic piece and the second elastic piece are both greater than 2 mm.

In some implementations, the metal conductor includes metal strips respectively connected to the feeding point and the conductive frame.

In some implementations, the antenna assembly further includes a matching circuit.

The matching circuit is disposed on the second circuit board and between the feeding point and the transmission circuit. The matching circuit includes at least one inductor and at least one capacitor.

The inductor is configured to connect the feeding point and the transmission circuit.

The capacitor is configured to connect the feeding point and the inductor.

In some implementations, the switch assembly includes a first type of connection terminal and a second type of connection terminal.

The first type of connection terminal is configured to connect to the matching circuit.

The second type of connection terminal is configured to connect the metal conductor and the conductive frame.

In some implementations, the terminal device further includes at least one of an audio component or a universal serial bus (USB) component.

The antenna assembly includes a first circuit board and a second circuit board.

The first circuit board and the second circuit board are respectively disposed on both sides of the at least one of the audio component or the USB component.

In some implementations, the USB component is configured not to be grounded and the USB component is configured to be coupled with the metal conductor.

The technical solution provided in the examples of the present disclosure may include the following effects.

In the examples of the disclosure, the metal conductor is connected between the feeding point and the conductive frame, namely, the feeding point is connected to the conductive frame through the metal conductor. Compared with the feeding point directly connected to the conductive frame, in the examples of the disclosure, the feeding point is connected to the conductive frame through the metal conductor, so that a radiation area of the radiator may be increased when a radio signal is transmitted and received, and the radiation efficiency of the antenna may be further improved. Moreover, the connection position of the conductive frame is unchanged, and the position of the feeding point may be flexibly set by means of the metal conductor. Therefore, the case where the position of the feeding point is limited may be alleviated. In addition, according to the examples of the disclosure, the radiation frequency band may be adjusted by the switch assembly to adapt to scenarios in which different antenna assemblies are involved. Moreover, since the feeding point is connected to the conductive frame through the metal conductor, a circuit flow path may be effectively increased, and a lowest frequency at which the terminal device transmits and receives the radio signal may be reduced, so that a range of a frequency band in which the terminal device transmits and receives the radio signal may be enlarged.

Other implementation solutions of the disclosure will be apparent to those skilled in the art from consideration of the specification and practice of the disclosure. This disclosure is intended to cover any variations, uses, or adaptations of the disclosure that follow the general principles thereof and include such departures from the present disclosure as come within known or customary practice in the art. It is intended that the specification and examples are considered as exemplary only, with a true scope and spirit of the disclosure being indicated by the following claims.

It should be understood that the disclosure is not limited to the precise construction already described above and illustrated in the accompanying drawings, and that various modifications and changes may be made without departing from the scope of the disclosure. The scope of the disclosure is limited only by the appended claims.

The invention claimed is:

1. An antenna assembly, comprising:
   a radiator of the antenna assembly comprising a metal conductor and a conductive frame;
      a first circuit board and a second circuit board; wherein
   the second circuit board is disposed separately from the first circuit board, and a switch is disposed on the first circuit board;
   wherein the metal conductor has one end configured to connect to a feeding point disposed on the second circuit board and another end configured to connect to the switch on the first circuit board and the conductive frame, and the switch is configured to adjust a radiation frequency band of the antenna assembly; and
   wherein the antenna assembly further comprises a connector configured to connect the conductive frame, the switch, and the metal conductor, wherein the connector comprises:
   a first elastic piece configured to connect the switch and the conductive frame; and
   a second elastic piece configured to connect the switch and the metal conductor;
   wherein the first elastic piece is connected to the second elastic piece through a connection line, and a line width of the connection line is larger than a preset width;
   wherein the antenna assembly further comprising: a radio frequency front end assembly and a matching circuit, wherein
   the radio frequency front end assembly is disposed on the first circuit board,
   the first circuit board is configured to connect with the second circuit board through a transmission circuit, and the transmission circuit is configured to perform at least one of following operations:
   transmitting a first electric signal to the radio frequency front end assembly; or
   transmitting a second electric signal generated by the radio frequency front end assembly to the feeding point;
   wherein the matching circuit is disposed on the second circuit board and between the feeding point and the transmission circuit; wherein the matching circuit comprises at least one inductor and at least one capacitor; and wherein
   the at least one inductor is configured to connect the feeding point and the transmission circuit; and
   the at least one capacitor is configured to connect the feeding point and the at least one inductor.

2. The antenna assembly of claim 1, wherein an area of the second circuit board is smaller than an area of the first circuit board.

3. The antenna assembly of claim 1, wherein diameters of the first and the second elastic pieces are both greater than 2 mm.

4. The antenna assembly of claim 1, wherein the metal conductor comprises metal strips respectively connected to the feeding point and the conductive frame.

5. The antenna assembly of claim 1, wherein the switch comprises:
   a first type of connection terminal configured to connect the matching circuit; and
   a second type of connection terminal configured to connect the metal conductor and the conductive frame.

6. The antenna assembly of claim 5, wherein the matching circuit comprises at least two matching sub-circuits, the switch comprises a switching circuit connected to the matching circuit through the first type of connection terminal, and the switch circuit is adapted to connect to at least one of the at least two matching sub-circuits through switching.

7. The antenna assembly of claim 1,
   the first elastic piece comprises a first fixed end and a first free end, the first fixed end is fixed on the first circuit board and connected to the switch, and the first free end is in contact with the conductive frame and pressed by the conductive frame; and
   the second elastic piece comprises a second fixed end and a second free end, the second fixed end is fixed on the first circuit board and connected to the switch, and the second free end is in contact with the metal conductor and pressed by the metal conductor.

8. The antenna assembly of claim 7, wherein the first fixed end of the first elastic piece and the second fixed end of the second elastic piece are fixed at different positions on the first circuit board.

9. The antenna assembly of claim 7, wherein the conductive frame comprises a groove, and at least a portion of the first free end of the first elastic piece is embedded in the groove.

10. A terminal device, comprising:
an antenna assembly, the antenna assembly comprising a radiator comprising a metal conductor and a conductive frame;
a first circuit board and a second circuit board; wherein the second circuit board is disposed separately from the first circuit board, and a switch is disposed on the first circuit board;
wherein the metal conductor has one end configured to connect to a feeding point disposed on the second circuit board and another end configured to connect to the switch on the first circuit board and the conductive frame, and the switch is configured to adjust a radiation frequency band of the antenna assembly; and
wherein the antenna assembly further comprises a connector configured to connect the conductive frame, the switch, and the metal conductor, wherein the connector comprises:
a first elastic piece configured to connect the switch and the conductive frame; and
a second elastic piece configured to connect the switch and the metal conductor;
wherein the first elastic piece is connected to the second elastic piece through a connection line, and a line width of the connection line is larger than a preset width;
wherein the antenna assembly further comprising: a radio frequency front end assembly and a matching circuit, wherein
the radio frequency front end assembly is disposed on the first circuit board;
the first circuit board is configured to connect with the second circuit board through a transmission circuit, and the transmission circuit is configured to perform at least one of the following operations:
transmitting a first electric signal to the radio frequency front end assembly; or
transmitting a second electric signal generated by the radio frequency front end assembly to the feeding point;
wherein the matching circuit is disposed on the second circuit board and between the feeding point and the transmission circuit; wherein the matching circuit comprises at least one inductor and at least one capacitor; and wherein
the at least one inductor is configured to connect the feeding point and the transmission circuit; and
the at least one capacitor is configured to connect the feeding point and the at least one inductor.

11. The terminal device of claim 10, further comprising:
at least one of an audio component or a universal serial bus (USB) component; wherein
the first circuit board and the second circuit board are respectively disposed on both sides of the at least one of the audio component or the USB component.

12. The terminal device of claim 11, wherein the USB component is configured not to be grounded and the USB component is configured to be coupled with the metal conductor.

13. The terminal device of claim 10, wherein an area of the second circuit board is smaller than an area of the first circuit board.

* * * * *